March 31, 1970   B. L. GODBERSEN   3,503,452
LATERALLY TILTABLE HARROW ATTACHMENT
Filed Nov. 18, 1966   2 Sheets-Sheet 1

INVENTOR
BYRON L. GODBERSEN
BY
R. Robert Henderson
ATTORNEY

March 31, 1970  B. L. GODBERSEN  3,503,452
LATERALLY TILTABLE HARROW ATTACHMENT
Filed Nov. 18, 1966  2 Sheets-Sheet 2

INVENTOR
BYRON L. GODBERSEN
BY
Robert Henderson
ATTORNEY

United States Patent Office 3,503,452
Patented Mar. 31, 1970

3,503,452
LATERALLY TILTABLE HARROW ATTACHMENT
Byron L. Godbersen, Ida Grove, Iowa 51445
Filed Nov. 18, 1966, Ser. No. 595,509
Int. Cl. A01b 23/04, 49/02, 13/00
U.S. Cl. 172—202                                 3 Claims

ABSTRACT OF THE DISCLOSURE

This invention relates to an apparatus for attaching a harrow to the beam of a trailing-type moldboard plow, wherein the apparatus includes a shaft attached to the plow beam and extended angularly rearwardly with a drawbar attached to the free end of the shaft, the drawbar extended at right angles to the direction of movement of the plow. A pair of resilient strap elements are connected in parallel and spaced relation to the drawbar, and carry alone and without other connection the harrow at their free rear ends.

---

This invention relates generally to implement attachments and specifically to harrow attachments for a plow frame.

It is an object of this invention to provide an improved harrow attachment.

It is another object of this invention to provide a novel apparatus for resiliently attaching a harrow to a plow.

A further object of this invention is the provision of a harrow attachment having a drawbar wherein the harrow is supported in a parallel relationship to the longitudinal axis of the drawbar.

A still further object of this invention is to provide a harrow attachment which permits either end of the harrow to move vertically relative to the other end of the harrow to maintain substantially equal penetration of the teeth of the harrow with the ground as the harrow is pulled across a field which is not level.

Yet another object of this invention is to provide a harrow attachment having a drawbar, wherein either end of the harrow is vertically movable relative to the other end thereof while the harrow is maintained in parallel relationship to the drawbar.

Yet a further object of the invention is to provide a harrow attachment which controls the working pressure of a harrow connected thereto relative to the ground, that is, the attachment controls the depth of penetration of the teeth of the harrow in the ground.

Another object of the invention is to provide a harrow attachment which is adjustable for mounting on the beam of any plow, regardless of the height of the beam from the ground, and yet maintain the harrow in a proper working attitude.

Still another object of this invention is to provide a harrow attachment which acts as a shock absorber when the harrow is in use.

A still further object of this invention is the provision of a harrow attachment having a pair of strap elements connected in laterally spaced relation to a harrow wherein each element acts independently of the other, thus allowing either end of the harrow to move vertically relative to the other end thereof.

Another object of this invention is the provision of a harrow attachment for a plow frame, having a split shaft, whereby part of the shaft is pivotally connected to the remainder thereof which allows the harrow to be swung from an operative position in engagement with the ground to a transport position supported over the plow frame.

A further object of this invention is to provide a harrow attachment having a split shaft pivotally connected together which utilizes a spring for biasing one portion of the shaft at an acute angle to the other portion thereof.

Yet another object of this invention is to provide a harrow attachment which is extremely economical of manufacture, rugged of structure, effective in service, and capable of attaining the objects listed hereinbefore.

These objects and other features and advantages of this invention will become more readily apparent upon reference to the following description, when taken in conjunction with the accompanying drawings, wherein.

Figure 1:
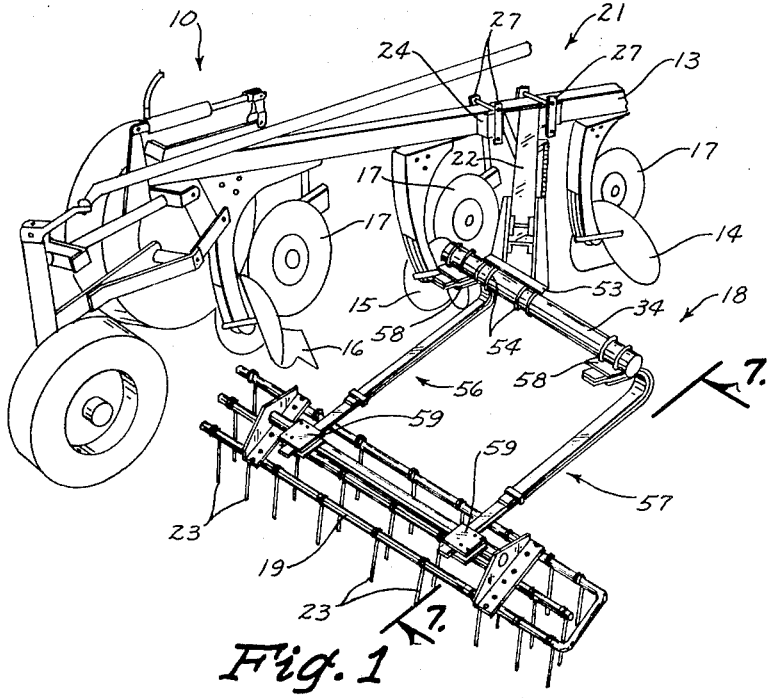
FIG. 1 is a perspective view of the harrow attachment of this invention, shown connected to a plow frame.

Referring now to the drawings and particularly to FIG. 1, a trailing-type moldboard plow is indicated generally at 10 connected to the drawbar 11 (FIG. 2) of a tractor 12. The plow is a three bottom plow having a beam 13 (FIG. 1) provided with the bottoms 14, 15, and 16, and the beam 13 also having three rolling coulters 17 mounted thereon.

Figure 2:
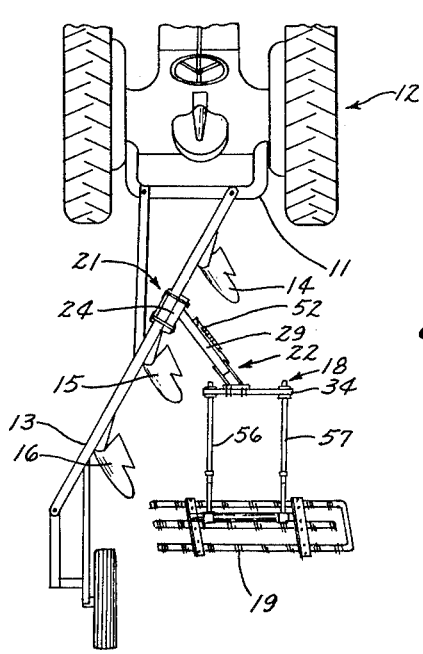
FIG. 2 is a reduced plan view of the structure connected to a plow frame which is attached to the drawbar of a tractor.

The harrow attachment of this invention is indicated generally at 18 in FIGS. 1 and 2, and comprises basically the harrow 19, a mounting bracket 21 connected to the beam 13, and a shaft unit 22 interconnecting the harrow 19 and the mounting bracket 21.

In this instance the harrow 19 is a spring tooth type harrow wherein the spring teeth, indicated at 23 in FIG. 1, are pivotally mounted for yieldable engagement with the soil. The invention is not, however, limited to a particular harrow, nor is it limited to use with a particular plow 10.

The mounting bracket 21 (FIGS. 1 and 6) includes a beam 24 to which one end of the shaft unit 22 is connected. The beam 24 is shown held against a side of the plow beam 13 by a quartet of bars 27, two of which are against the exposed side of the beam 24 and the other two of which are held against the opposite side of the plow beam 13. The bars 27 are interconnected over and under the beams 13 and 24 by a quartet of connecting bolts 28. Again, the invention of the resilient shaft unit 22 is not limited to a particular mounting bracket 21.

The shaft unit 22 comprises an elongated shaft 29 (FIG. 6) adapted to be connected at one end 31 thereof to the mounting bracket 21 and having a rearwardly extending free end 32, a linkage unit 33 pivotally mounted on the free end 32, a drawbar 34 connected to the linkage unit 33, and a resilient unit 36 interconnected between the drawbar 34 and the harrow 19.

Figure 5:
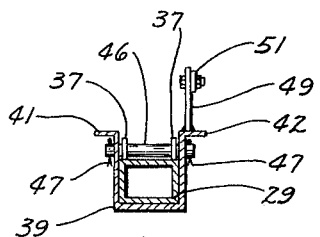
FIG. 5 is a sectional view taken along the line 5—5 in FIG. 3.
Figure 6:
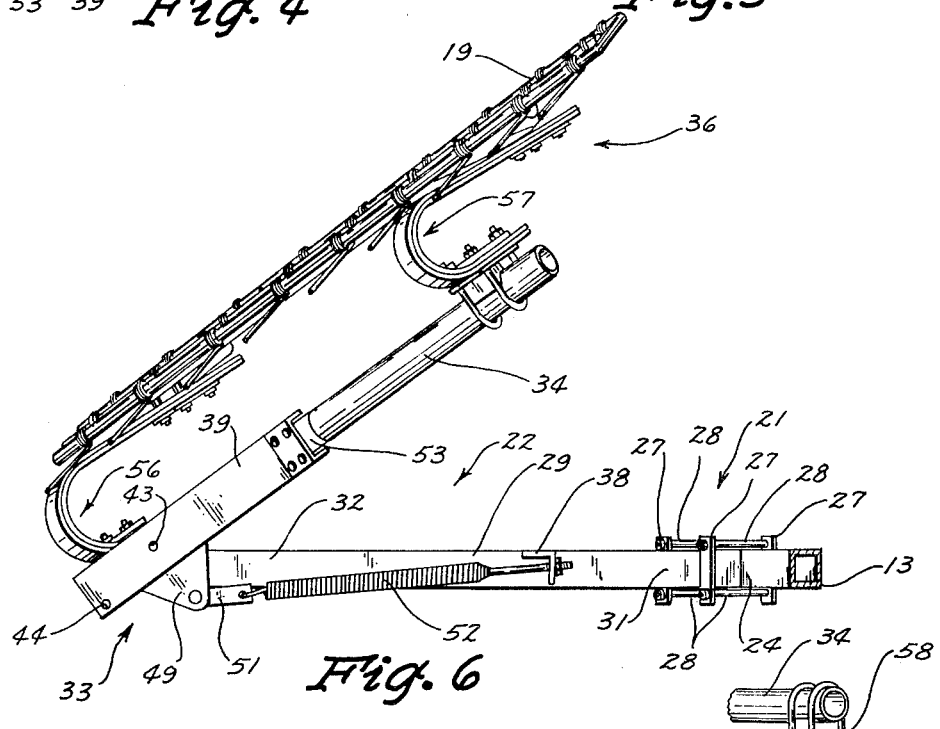
FIG. 6 is a side elevational view showing the harrow in transport position.
Figure 7:
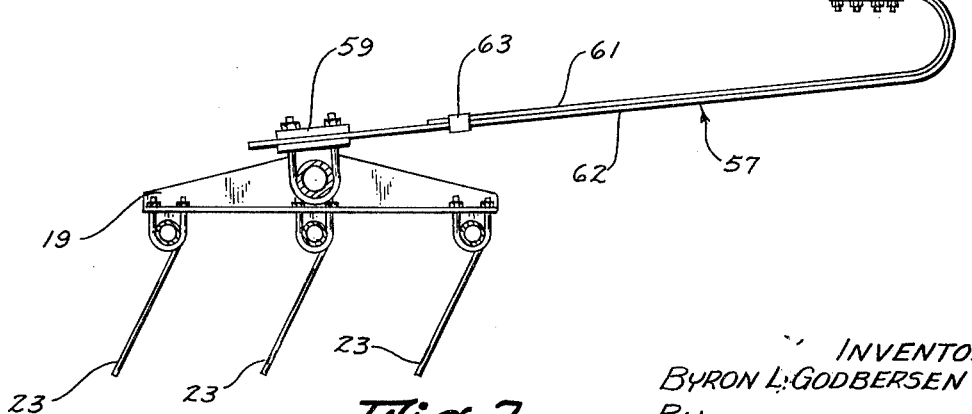
FIG. 7 is a side elevational view of the harrow structure with the teeth engaging the ground.

As shown in FIGS. 2 and 6, the shaft 29, rectangular in cross section (FIG. 5), is connected to the beam 24 (FIG. 2) as by welding, at an angle of approximately 45° to the longitudinal axis of the beam. A pair of upstanding, laterally aligned bearing mounts 37 (FIGS. 3 and 5) are secured to the free end 32 near the opposite edges of the top side thereof. An angle bracket 38 (FIG. 6) is mounted to a side of the shaft 29, intermediate the ends thereof, as shown in FIG. 7, for a purpose hereinafter described.

The linkage unit 33, includes a substantially U-shaped cradle 39 having a pair of flanges 41 and 42 (FIGS. 3 and 5) extending outwardly therefrom, each flange being integral with an edge of the cradle. The cradle 39 has a pair of horizontally disposed holes 43 and 44 (FIG. 4) formed through both walls and at right angles to the longitudinal axis thereof. The first hole 43 is disposed intermediate the ends of the cradle 39 and in axial alignment with the mounts 37, while the second hole 44 is disposed on the forward end of the cradle 39 above the shaft 29, as viewed in side elevation in FIG. 4. A pin 46 is seated in the first hole 43 and through similar holes (not shown) formed in the mounts 37, and secured thereto by a pair of cotter pins 47 (FIG. 5). A bolt 48 (FIG. 3) and nut (not shown) are detachably secured in the second hole 44 with the shank of the bolt 48 transversely disposed immediately above the top side of the shaft 29.

An arm 49 (FIG. 6), having an upwardly projecting free end, is secured, as by welding, on the flange 42. Pivotally mounted on the free end of the arm is a link 51. An elongated spring 52 interconnects the link 51 and the angle bracket 39 on the shaft 52, for biasing the cradle 41 in a position angularly inclined to the shaft 29.

Figure 3:
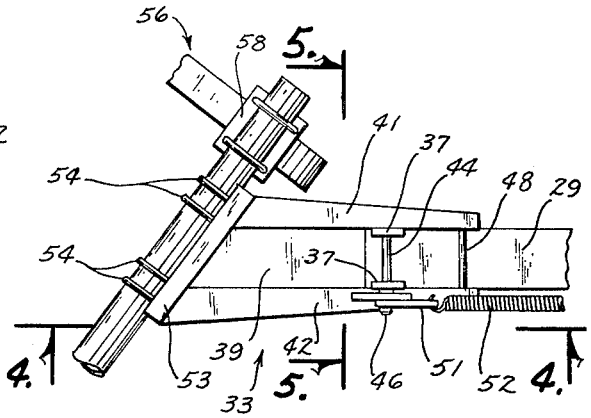
FIG. 3 is a fragmentary plan view of the shaft connected to the drawbar of the invention.
Figure 4:
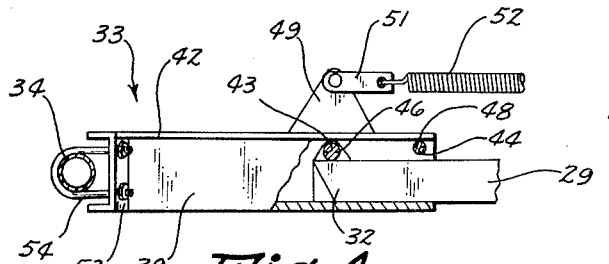
FIG. 4 is a sectional view taken along the line 4—4 in FIG. 3.

Mounted on the rear end of the cradle 39 is a bar 53 (FIG. 3), the face of which is angularly disposed to the longitudinal axis of the cradle. The drawbar 34, tubular in cross section, is connected to the bar 53 by a quartet of U-clamps 54, as best shown in FIG. 3.

The resilient unit 36 comprises a pair of parallel strap elements 56 and 57 (FIG. 2) adjustably connected, at their forward end, to the drawbar in laterally spaced relation by a pair of mounting devices 58 (FIG. 1), and at their rearward end to the harrow 19 by a second pair of mounting devices 59. In FIGS. 1 and 2 it will be seen that the harrow 19 is supported by said resilient strap elements 56 and 57 in parallel relationship to the longitudinal axis of the drawbar 34.

As each strap element 56 and 57 (FIG. 1) is identical, only one will be described with like reference numerals indicating like parts. Each element includes a pair of straps 61 and 62, formed from spring steel and disposed in juxtaposed relation to each other, as best shown in FIG. 7, with the rearward end of the lower strap 62 extending beyond the rearward end of the upper strap 61. Both straps 61 and 62 are arcuately shaped at their forward ends and secured thereat to the mounting device 58. The upper strap 61, at its rearward end, is connected to the lower strap 62 by a clamp 63, and the lower strap 62, at its rearward end, is secured to the second mounting device 59.

In use, the resiliency of the straps 61 and 62 allows either end of the harrow 19 to move vertically relative to the other end of the harrow while the harrow maintains a parallel relationship with the drawbar 34, thus if the ground is not level one end of the harrow will move and all of the teeth 23 will maintain substantially equal penetration of the ground. When the harrow strikes a foreign object in the ground it will ride over the object thus the resiliency of the straps also acts as a shock absorber.

To adjust the depth of penetration of the teeth of the harrow with the ground the mounting devices 58 are adjustable to any one of a plurality of positions arcuately spaced around the periphery of the drawbar while similar adjustments are also made to the second mounting devices 59 to maintain proper alignment of the harrow with the ground. Also, as the beams 13 of plows of various manufacture vary in height above the ground, adjustments of the mounting devices 58 and 59 are made to allow proper alignment of the harrow and depth of penetration of the teeth, thus providing a harrow attachment adapted to mount on any plow beam.

To transport the harrow to the field along narrow roads and lanes and through narrow gates, the linkage unit 33 permits the harrow 19 to be swung from a ground engaging position (FIG. 7) to a transport position as shown in FIG. 6. Upon removal of the bolt 48 (FIG. 4) the harrow is pivotable about the pin 46 to a position wherein the cradle 39, or outer portion of the shaft unit 22, is disposed at an acute angle relative to the shaft 29, or inner portion of the shaft unit 22. The harrow in the transport position lies in a plane substantially parallel to and over the plow beam 13. The spring 52, in an extended position when the harrow engages the ground, normally biases the harrow to a transport position, thus facilitating pivotal movement of the harrow.

I claim:

1. A harrow attachment for a plow frame comprising in combination;
   a harrow;
   shaft means adapted to be mounted on one end thereof to the plow frame and having a free end;
   a drawbar connected to said free end; and
   resilient means connected at a rear end to said harrow and connected at a front end to said drawbar, said resilient means supporting said harrow in parallel relationship to the longitudinal axis of said drawbar, said harrow having opposite ends either of which is vertically moveable relative to the other end while said harrow maintains said parallel relationship with said drawbar, said resilient means including a pair of parallel strap units mounted on said drawbar in laterally spaced relation,
   each of said strap units comprising a pair of straps disposed in juxtaposed relation to each other, one of said straps connected at the rear end to said harrow and connected at the front end to said drawbar, the other of said straps connected at the rear end to said one strap near said rear end thereof and connected at the front end to said drawbar,
   said straps being connected to said drawbar by a pair of mounting devices, each of said mounting devices being adjustably connected to said drawbar at any one of a plurality of positions arcuately spaced around the periphery of said drawbar.

2. A harrow attachment as defined in claim 1, and further wherein said shaft means comprises an inner portion and an outer portion, said inner portion connected to the plow frame, and said outer portion connected on one end to said drawbar and pivotally connected on the other end to the free end of said inner portion, said outer portion supported by said inner portion in a first position wherein said harrow is ground engageable, and in a second position wherein said harrow is disposed above the plow frame.

3. A harrow attachment as defined in claim 2, and including further detachable locking means operable to hold said portions in said first position.

References Cited

UNITED STATES PATENTS

| 1,377,430 | 5/1921 | Petty | 287—53 |
|---|---|---|---|
| 201,694 | 3/1878 | McPike | 172—202 |
| 298,486 | 5/1884 | Long | 172—202 X |
| 1,922,219 | 8/1933 | Schumann | 172—624 |

FOREIGN PATENTS

| 80,576 | 6/1934 | Sweden. |
|---|---|---|

ROBERT E. BAGWILL, Primary Examiner

STEPHEN C. PELLEGRINO, Assistant Examiner

U.S. Cl. X.R.

172—711